United States Patent
Obrador

(10) Patent No.: US 7,058,220 B2
(45) Date of Patent: Jun. 6, 2006

(54) METHOD AND SYSTEM FOR PROCESSING IMAGES USING HISTOGRAMS

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 688 days.

(21) Appl. No.: 10/133,413

(22) Filed: Apr. 29, 2002

(65) Prior Publication Data

US 2003/0202692 A1    Oct. 30, 2003

(51) Int. Cl.
*G06K 9/00* (2006.01)
*G06K 9/68* (2006.01)

(52) U.S. Cl. .................... 382/168; 382/218
(58) Field of Classification Search ............. 382/154, 382/164, 168, 170, 172, 181, 218, 219, 220, 382/260, 278, 305; 358/3.13, 3.26, 505, 358/522, 524, 530; 348/672; 708/304
See application file for complete search history.

(56) References Cited

U.S. PATENT DOCUMENTS

| | | | | |
|---|---|---|---|---|
| 4,731,863 A * | 3/1988 | Sezan et al. | ................. | 382/172 |
| 5,097,433 A * | 3/1992 | Caracciolo | ................... | 708/304 |
| 5,751,848 A * | 5/1998 | Farrell | ......................... | 382/172 |
| 5,923,383 A * | 7/1999 | Kim | ............................ | 348/672 |
| 5,982,927 A * | 11/1999 | Koljonen | ..................... | 382/168 |
| 6,219,447 B1 * | 4/2001 | Lee | ............................. | 382/168 |
| 6,351,556 B1 * | 2/2002 | Loui et al. | ................... | 382/164 |
| 6,385,335 B1 * | 5/2002 | Rudd et al. | ................. | 382/154 |
| 6,683,983 B1 * | 1/2004 | Shen et al. | ................. | 382/168 |
| 6,687,416 B1 * | 2/2004 | Wang | ......................... | 382/278 |
| 6,829,063 B1 * | 12/2004 | Allebach et al. | ........... | 358/3.13 |
| 6,873,441 B1 * | 3/2005 | Kuwabara et al. | ......... | 358/3.26 |

* cited by examiner

Primary Examiner—Amri Alavi

(57) ABSTRACT

A method and system are disclosed for processing images using histograms. In accordance with exemplary embodiments of the present invention, first image data is received for a first image. A first histogram of the first image is generated using the first image data. At least one peak from the first histogram is selectively removed to generate a modified first histogram. The first image is processed using the modified first histogram.

46 Claims, 9 Drawing Sheets

METHOD AND SYSTEM FOR PROCESSING IMAGES USING HISTOGRAMS

BACKGROUND

1. Field of the Invention

The present invention relates to image processing. More particularly, the present invention relates to a method and system for processing images using histograms.

2. Background Information

Conventional image processing techniques can use low-level image features to classify the images. For example, an analysis of the colors, textures and shape features can be used to facilitate, for example, the comparison of two or more images. Thus, low-level image features can be used to determine similarities between images.

Various statistical measurements of the low-level features of the images can be used to perform the image classification. A histogram is an example of a first-order statistic that is used in image classification. In image processing, a histogram is a graphical representation of the frequency of occurrence of image pixels that correspond to the quantized levels of a particular variable of interest in an image. A histogram is a divided into intervals or bins, where each bin corresponds to a quantized level of the variable of interest. Generally, the variable of interest is plotted along the X-axis and the frequency or number of occurrences of pixels in the image that correspond to each bin is plotted along the Y-axis. The pixels in each been are added or integrated together. The magnitude or height of a bin (plotted with respect to the Y-axis) represents the frequency of occurrences of the pixels in the image that correspond to that bin. The greater the height of bin, the greater the frequency of occurrence of the pixels that correspond to the particular quantized level of the variable of interest.

For example, an image can be divided into 256 discrete colors, where color is the variable of interest. The color histogram represents the distribution of colors in the image. However, any low-level image feature can be used as the variable of interest in the histogram (e.g., texture, brightness, intensity, etc.). In this example, each histogram bin represents a color. For each bin, the histogram indicates the whole number of pixels in the image that have the color corresponding to that bin. The greater the height of a particular bin (with respect to the Y-axis), the more pixels with that particular color that reside in the image. In the histogram, if a bin with a high frequency of occurrence is situated next to or near a bin with a low frequency of occurrence on the graph, the bin with the high frequency of occurrence forms a "peak". If a neighborhood of contiguous bins has a high frequency of occurrence, then the corresponding peak can be not only high, but also wide.

Histograms can be used to determine the similarity of images. For example, color histograms can be constructed for each of two images. The distance (e.g., the Euclidean distance or histogram correlation) between the first image histogram and the second image histogram can be used to define the similarity match between the two color distributions. The less similar the two images are, the greater the distance between the two color distributions of the two images. Image classification based upon the weighted distance between color histograms is described in James Hafner, et al., "Efficient Color Histogram Indexing for Quadratic Form Distance Functions," *IEEE Transactions on Pattern Analysis and Machine Intelligence* 17(7), pages 729–736 (1995), the disclosure of which is hereby incorporated by reference in its entirety.

However, for two similar images, minor color variations can be introduced into one of the two images. In such a case, even though one of the images has minor color variations, the two images still exhibit a high degree of similarity. If image similarity is determined based upon the distance between color histograms, a large distance can be generated between the color histograms of the two similar images as a result of the minor color variations introduced into one of the images. Thus, conventional techniques can indicate that the two images are not similar, even though, in actuality, the images still exhibit a high degree of similarity.

SUMMARY OF THE INVENTION

A method and system are disclosed for processing images using histograms. In accordance with exemplary embodiments of the present invention, first image data is received for a first image. A first histogram of the first image is generated using the first image data. At least one peak from the first histogram is selectively removed to generate a modified first histogram. The first image is processed using the modified first histogram.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
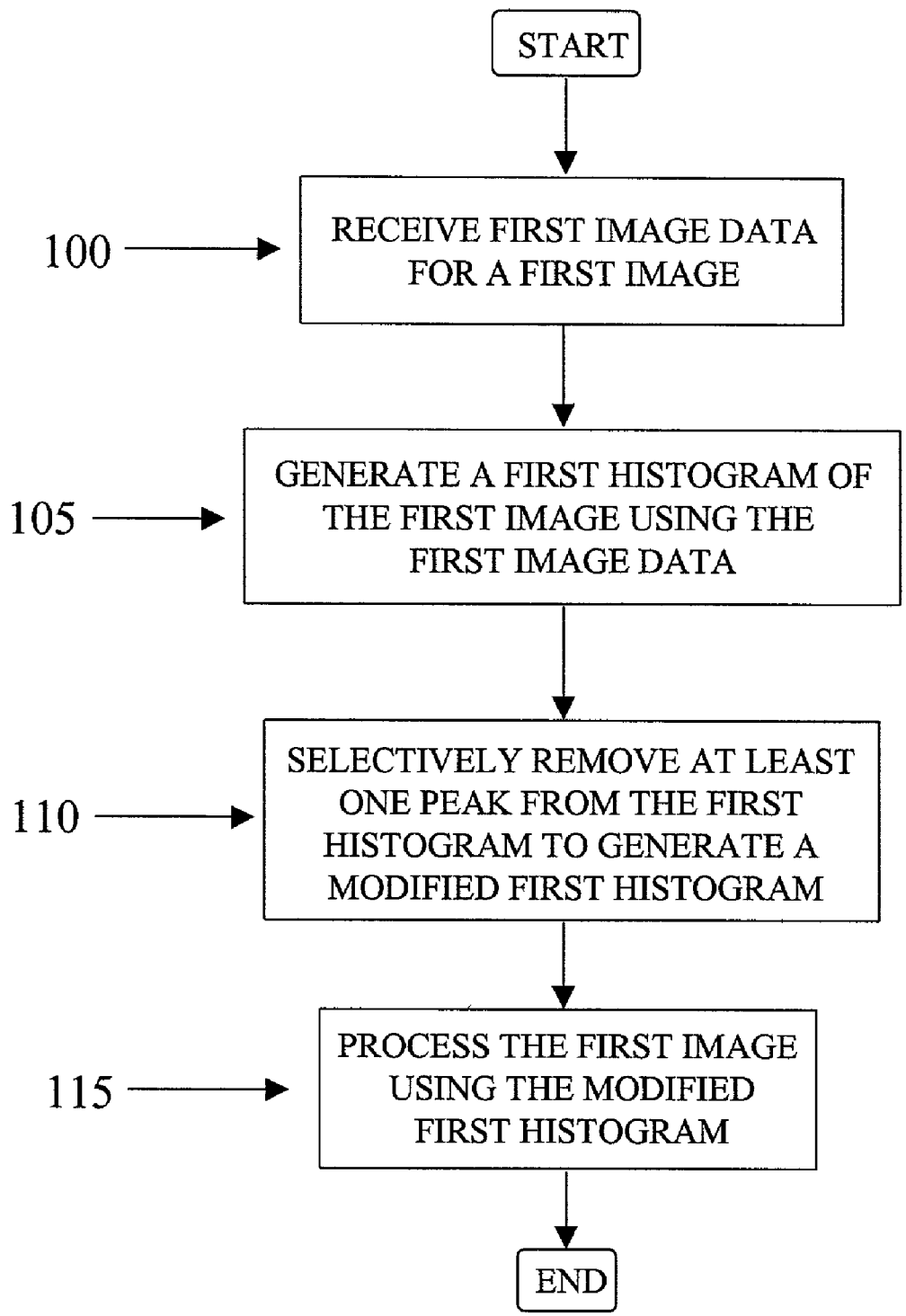
FIG. 1 is a flowchart illustrating the steps for processing images using histograms in accordance with an exemplary embodiment of the present invention.

FIG. 1 is a flowchart illustrating the steps for processing images using histograms in accordance with an exemplary embodiment of the present invention. In step 100, first image data is received for a first image. According to exemplary embodiments, an image is any image, stored in electronic form in any type of electronic storage medium or computer memory, from which a histogram can be generated. For example, an image can be any digital image, series of digital images, or digital video captured from any type of digital image or video capturing device, such as, for example, digital video cameras, digital cameras, video capture cards or any other image or video capturing device. Alternatively, an image can be an analog image, series of analog images, or analog video captured from, for example, cameras, video cameras or any other analog image or video capture device, that are scanned or otherwise digitized and stored as a digital image or digital video. According to exemplary embodiments, image data is any collection of information in electronic form that can comprise an image.

The first image data for the first image can be received from any electronic source over any type of electronic transmission medium that is capable of transmitting and receiving electronic information. For example, the image data can be stored in any type of computer database, computer memory, or any other type of electronic storage medium. The electronic storage media can be located locally, for example, within a personal computer, computer workstation or any other form of computer processing system that can process image data. Alternatively, the electronic storage media can be located remotely, for example, in an electronic database that resides in a network (e.g., the Internet) that is remote from the computer processing system used to process the image data. If located remotely, the image data can be retrieved from the electronic storage media using any protocol and any electronic transmission medium capable of communicating electronic information. Alternatively, the image data can be received in any manner known in the art from any of a variety of electro-optical or imaging systems or sensors including, but not limited to, a thermal sensor, imaging radar sensor, infrared sensor, Charge-Coupled Device (CCD) cameras, Forward-Looking Infrared (FLIR), vidicon cameras, Low Light Level cameras, laser illuminated cameras or the like. Thus, the image data can be received from any system which collects image data.

In addition, the image data can be received manually from either the local or remote location by a user who initiates the process according to exemplary embodiments of the present invention. For example, a user can receive an electronic image file from the computer memory of a computer by opening an image file from the computer memory using any known image viewing application. However, the image data can be manually received using any means for receiving electronic data from any type of local or remote electronic storage media. Alternatively, the image can be received automatically from either the local or remote location. For example, a computer or any other form of computer processing system, programmed to perform the process according to exemplary embodiments of the present invention, can, upon activation, query the electronic storage media storing the image data to receive the image data automatically from the electronic storage media. However, the image data can be automatically received using any means for receiving electronic data from any type of local or remote electronic storage media.

In step 105, a first histogram of the first image is generated using the first image data. The first histogram of the first image can be based on any feature or characteristic of the image. For example, the first histogram can be a graphical representation of the frequency of occurrence of, but not limited to: one or more colors or shades of colors in the image; one or more grey levels in the image; the luminance or intensity of the image; or any other feature or characteristic of the image for which the frequency of occurrence of that feature or characteristic can be graphically represented in a histogram. Those of ordinary skill in the art will recognize that any number of histograms based on any feature or characteristic can be generated for the first image for use in the processing of images using histograms according to exemplary embodiments of the present invention. The following description of the generation of a first histogram is for purposes of illustration, and not limitation.

To generate the first histogram, any method known in the art of histogram generation can be used for generating a histogram from the first image. For example, for any feature or characteristic in the first image, the first image can be composed of L discrete levels $\{X_0, X_1, \ldots, X_{L-1}\}$ of that feature or characteristic, where $X_0$ can correspond to the lowest level and $X_{L-1}$ can correspond to the highest level. For example, the first image can be composed of 256 discrete color levels. In this example, $X_0$ can be the white color level and $X_{L-1}$ can be the black color level, with all other color levels residing between white ($X_0$) and black ($X_{L-1}$). Each histogram bin represents one of the quantized levels of the feature or characteristic. For each bin, the histogram indicates the whole number of pixels in the image that have the feature or characteristic corresponding to that bin (i.e., level). Those of ordinary skill in the art will recognize that the first image can be quantized into any number of levels using any feature or characteristic of the image, of which 256 discrete color levels is but one example that is used for illustrative purposes only, and not for purposes of limitation. Thus, once the first image has been quantized into levels for the chosen feature or characteristic, then for each pixel in the first image, the pixel is placed in a corresponding bin to generate the histogram.

However, any method of histogram generation can be used, such as that described in, for example, U.S. Pat. Nos. 5,751,848, 5,923,383, and 6,219,447, the disclosure of each of which is hereby incorporated by reference in their entirety.

According to exemplary embodiments, the first histogram can have at least one peak. However, skilled artisans will recognize that the first histogram may not have any peaks (e.g., if the first image is of a background texture, the resulting first histogram may have no defined peaks). In a histogram, the greater the number of pixels in a particular bin, the greater the magnitude or "height" (with respect to, for example, the Y-axis) of that bin. If a bin with a high frequency of occurrence is situated next to or near a bin with a low frequency of occurrence, the bin with the high frequency of occurrence forms a "peak," while the bin with the low frequency of occurrence forms a "valley". If a neighborhood of contiguous bins has a high frequency of occurrence, then the corresponding peak can be not only high, but also wide.

Figure 6A:
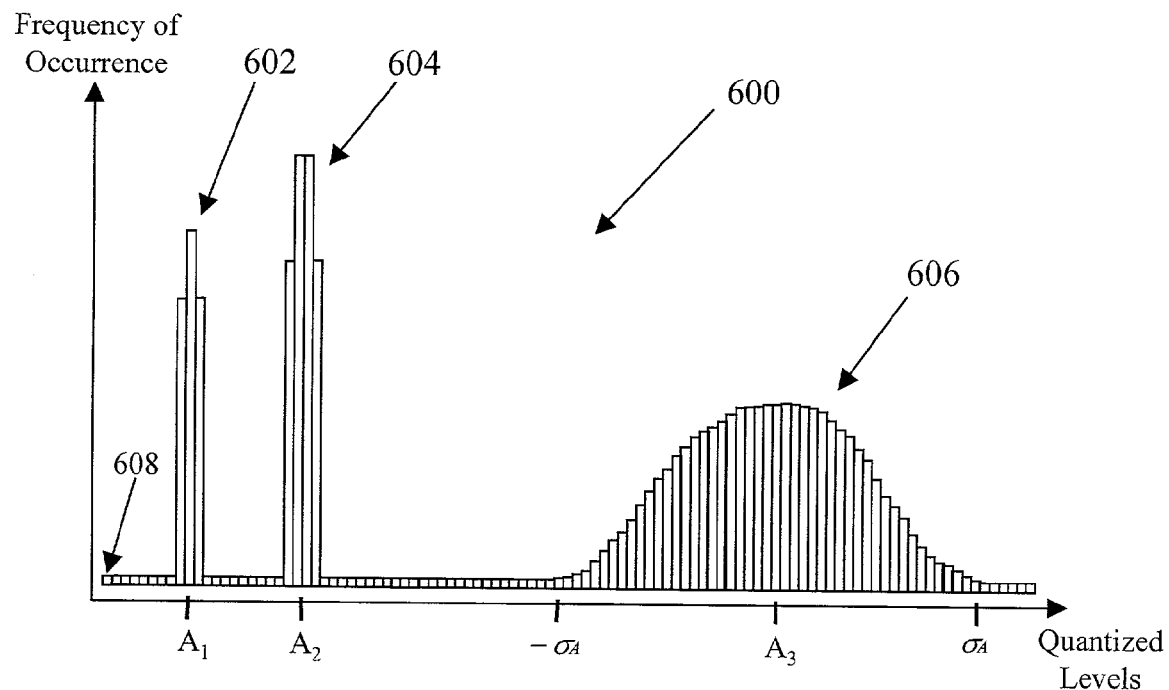
FIGS. 6A, 6B and 6C are graphical representations of histograms illustrating the processing of images using histograms in accordance with an exemplary embodiment of the present invention.
Figure 6A:
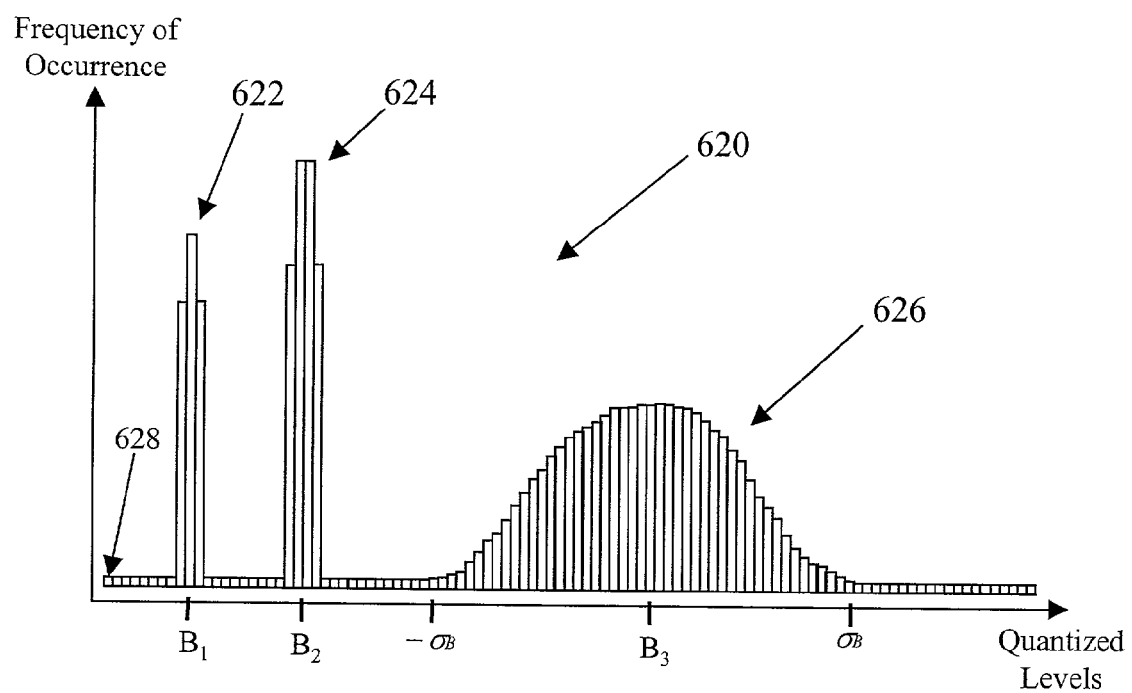

An example of peaks is shown in FIG. 6A. First histogram 600 illustrates an exemplary first histogram of the first image. Each of the bins of first histogram 600 can correspond to a quantized level of any feature or characteristic of the first image. Those of ordinary skill in the art will recognize that first histogram 600 is merely an example of a histogram that is used for purposes of illustration and not limitation, as first histogram 600 can change not only for different features and characteristics of the image that have been quantized, but can change for different images. First histogram 600 has three peaks: narrow peak 602, with its maximum position at point A1 on the histogram; narrow peak 604, with its maximum position at point A2 on the histogram; and wide peak 606, with its maximum position at point A3. Wide peak 606 extends from $-\sigma_A$ to $\sigma_A$ on the histogram, and is, therefore $2\sigma_A$ wide. The narrow peaks can, for example, correspond to localized objects or features in the image. The localized objects or features can, for example, change between images. The mid-size and wide peaks, however, can correspond to background information or large-scale features or characteristics, such as, for example, image texture. The background information can be, for example, similar between images. However, the localized objects and background information can vary or be similar from image to image, depending on the images.

As can be seen from first histogram 600, the area between narrow peaks 602 and 604 and between narrow peak 604 and wide peak 606 forms valleys. Narrow peaks 602 and 604 and wide peak 606 represent bins for which the pixels corresponding to those bins exhibit a high frequency of occurrence of the particular feature or characteristic of interest. Thus, a "peak" can be any structure contained in the histogram.

Figure 6B:
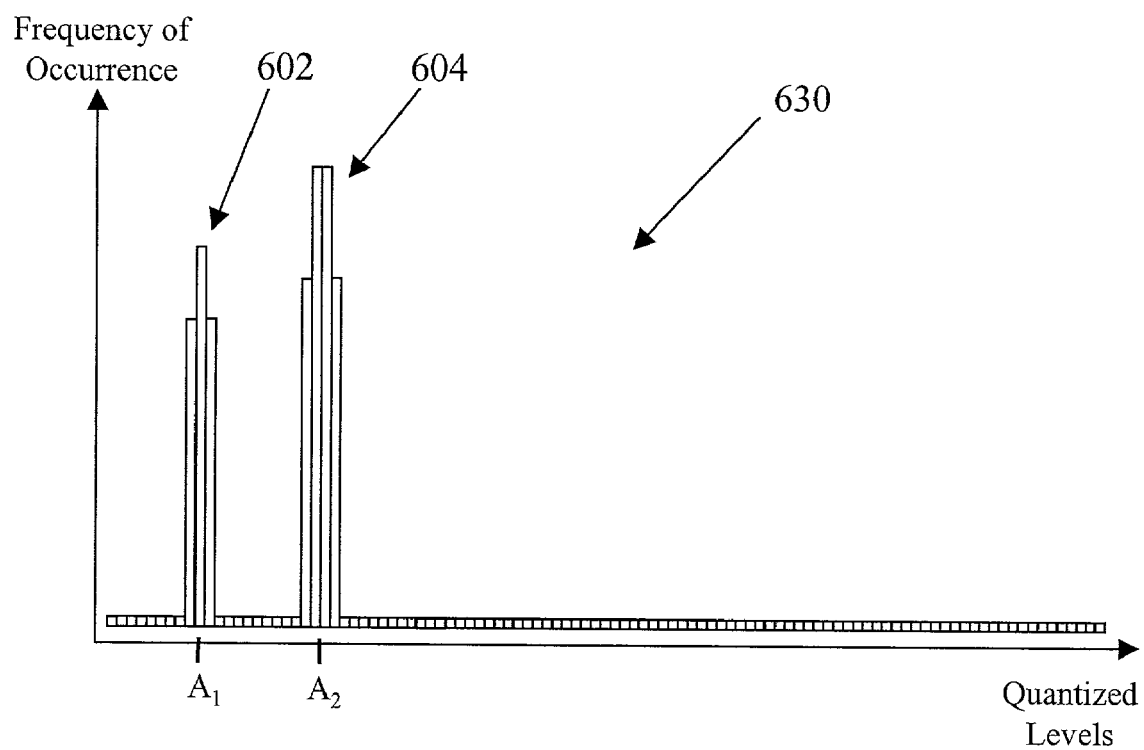
Figure 6B:
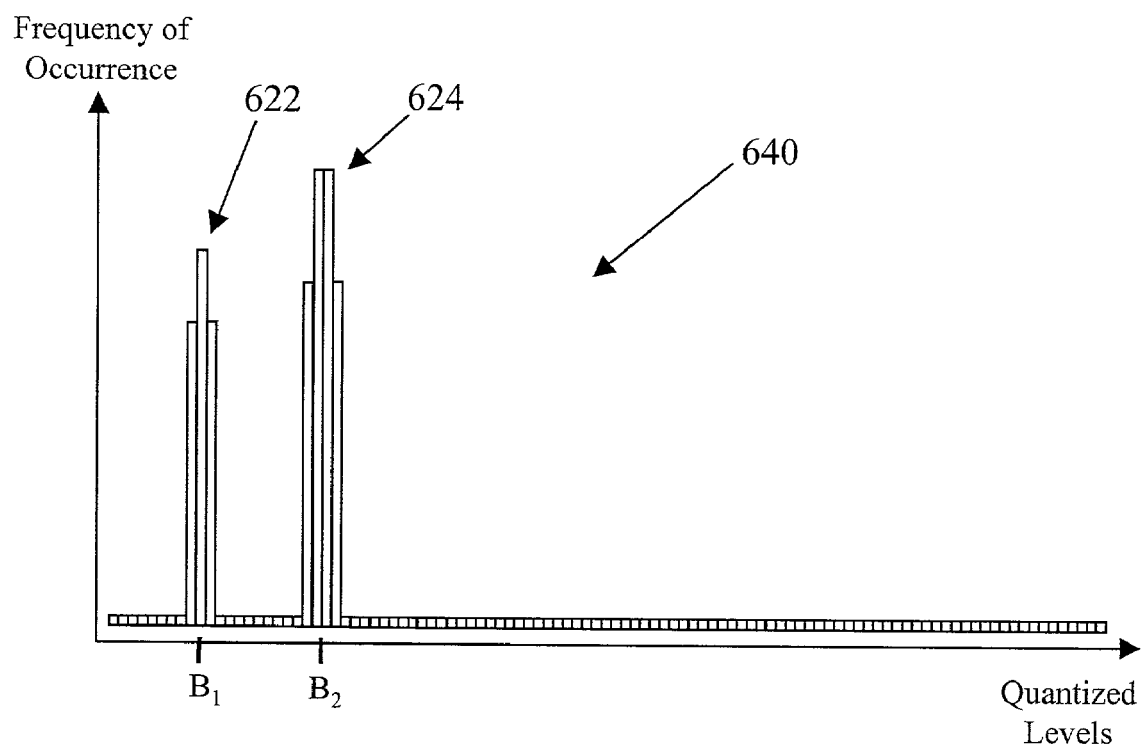

In step 110, at least one peak from the first histogram is selectively removed to generate a modified first histogram. As used herein, a "modified histogram" is a histogram for which at least one peak has been removed or otherwise modified. For example, as shown in FIG. 6B, modified first histogram 630 corresponds to first histogram 600, but with wide peak 606 selectively removed. Any method for selectively removing at least one peak from the first histogram can be used. As used herein, "selectively removing" can be the partial or complete removal, or any form of modification, of information contained in the histogram. For example, the selective removal of at least one peak can be the complete or partial deletion of the at least one peak from the histogram, or a modification of the at least one peak to form at least one peak of a different shape, width, size, etc. To selectively remove at least one peak, for example, the pixels corresponding to the bins that form the at least one peak in the histogram can be partially or completely deleted.

According to an alternate exemplary embodiment, at least one filter can be used to selectively remove at least one peak in the first histogram. Any filter for selectively removing information from a histogram can be used. According to an exemplary embodiment, the at least one filter is a stack filter. Stack filters are a class of non-linear, spatial operators that can be used for, for example, noise suppression. In a stack filter, numbers are ordered into a stack, and the desired number in the stack is chosen as the output of the filter. Filters such as median filters and other rank-order filters can be expressed as stack filters. Stack filters are described in, for example, U.S. Pat. No. 5,097,433, the disclosure of which is hereby incorporated by reference in its entirety.

The output of a stack filter can be a composition of maximum and minimum operations on samples within a window of finite size. According to exemplary embodiments, the stack filter for selectively removing peaks from the first histogram includes a minimum filter and a maximum filter. For example, an "opening" filter is a stack filter based on performing a minimum filter followed by a maximum filter. A minimum filter outputs the minimum value in the filter window, while the maximum filter outputs the maximum value in the filter window. By changing the length of the opening filter, peaks of different sizes (e.g., widths) can be selectively removed. For example, a short filter length can be used to selectively remove peaks of narrow width. The filter length can be increased to remove peaks of mid-size width and increased further to remove wide peaks.

For purposes of illustration, but not limitation, referring to FIG. 6A, a stack filter of, for example, filter length five can be used to selectively remove narrow peak 602 (which is three bins wide), while a stack filter of length six can be used to selectively remove narrow peak 604 (which is four bins wide), and a stack filter of length 49 can be used to selectively remove wide peak 606 (which is 47 bins wide). According to exemplary embodiments, the at least one filter has a predetermined length. For example, several filters can be used, each with a predetermined length to selectively remove peaks of different widths or sizes. However, those of ordinary skill in the art will recognize that any number of filters each with any desired filter length can be used, depending on the width of the peak or peaks to be selectively removed. By using several filters with varying filter length, exemplary embodiments can decompose the original histogram into several modified histograms, with each modified histogram having a different peak or peaks selectively removed, corresponding to different features or characteristics of the original image being removed.

In conventional techniques, a stack filter is applied to the image itself to, for example, suppress noise in the image. In contrast, to selectively remove at least one peak in the first histogram, exemplary embodiments apply the stack filter to the histogram itself. According to an exemplary embodiment of the present invention, a one-dimensional stack filter of a given length can be applied to the first histogram. However, stack filters of higher dimensions and of any length can also be applied to the first histogram. Referring to FIG. 6A, a one-dimensional stack filter can be applied to first histogram 600 starting at, for example, bin 608. However, the one-dimensional stack filter can be applied to first histogram 600 starting at any bin to selectively remove any desired peak. Application of the stack filter selects a value from one of the bins within the stack filter window (e.g., the bin located at the center of the filter window). Once applied, the one-dimensional stack filter can be "slid" or otherwise shifted by at least one bin in the direction of increasing bins or quantization levels, or in any other direction, depending on the starting point of the stack filter window. Thus, the one-dimensional stack filter can be applied as a sliding filter window over first histogram 600 to selectively remove at least one peak from the first histogram to generate a modified first histogram.

Figure 2:
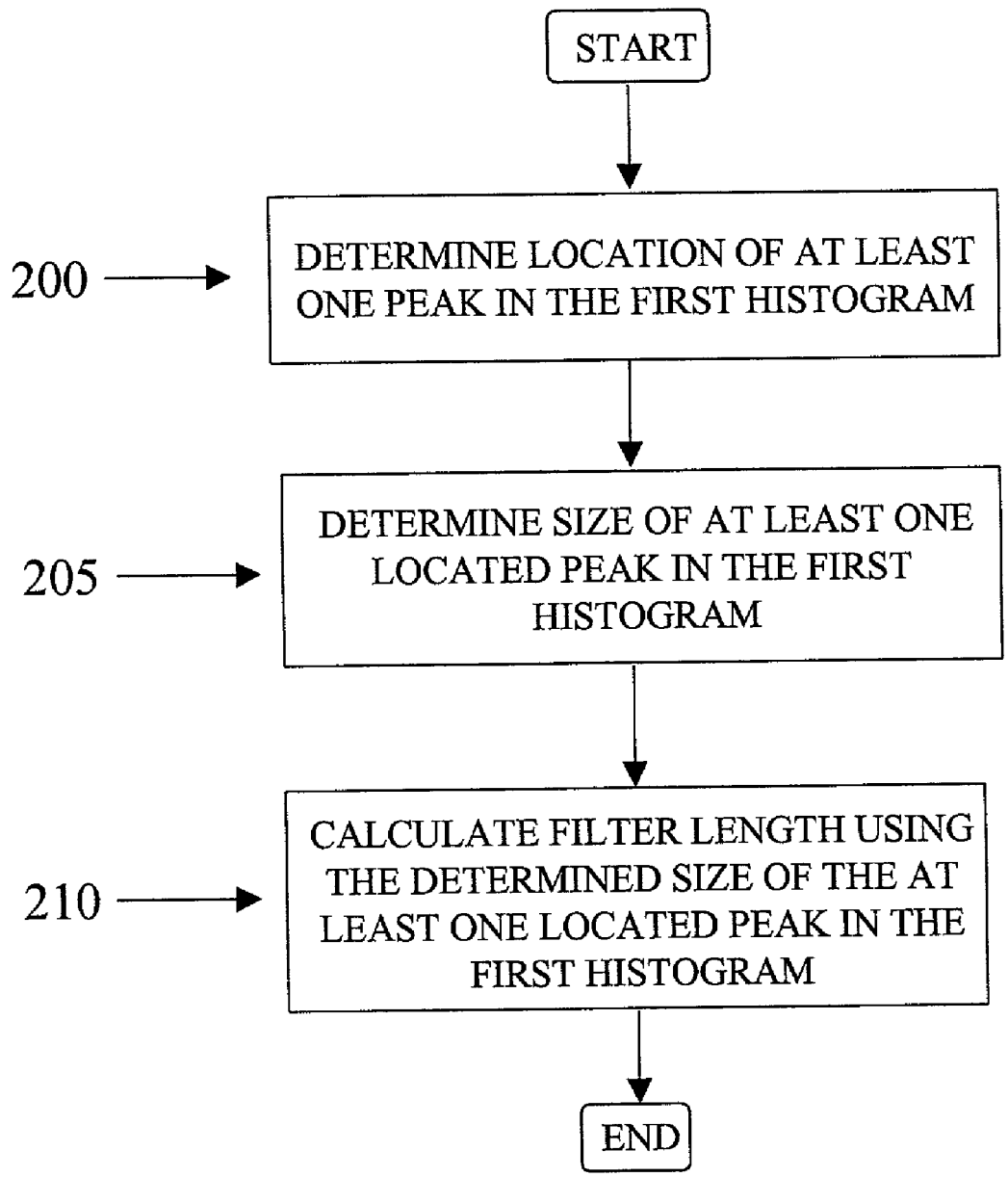
FIG. 2 is a flowchart illustrating the steps for selectively removing peaks from a first histogram in accordance with an exemplary embodiment of the present invention.

According to an alternate exemplary embodiment, the filter length of the filters can be determined adaptively for each histogram based on the sizes of the at least one peak in the histogram. Referring to FIG. 2, in step 200, a determination is made of the location of the at least one peak in the first histogram. Any method for detecting or locating at least one peak in a histogram can be used, such as that described in U.S. Pat. No. 4,731,863, the disclosure of which is hereby incorporated by reference in its entirety. Once located, then in step 205, a determination is made of the size of the at least one located peak in the first histogram. Any method for determining the size of at least one peak can be used. According to exemplary embodiments, the size of the at least one peak can be the width of the peak, although any measure of size (e.g., height) can be used. For example, the width of the at least one peak can be determined by counting the number of bins that comprise the at least one peak or the calculated difference between the starting bin number of the at least one peak and the ending bin number of the at least one peak. For purposes of illustration, narrow peak 602 is comprised of three bins, thus having a width of three.

In step 210, the length of the least one filter is calculated using the determined size of the at least one located peak in the first histogram. For example, the length of the filter can be the same size as or larger than the width of the at least one peak. For purposes of illustration, since the width of narrow peak 602 is three, the corresponding filter length can be three or greater. However, any non-zero filter length can be used to selectively remove at least one peak. Thus, according to an exemplary embodiment, the length of the filters used to selectively remove at least one peak from the first histogram are not predetermined, but are adaptively determined based on the sizes (e.g., widths) of the at least one peak contained in the first histogram.

Figure 3:
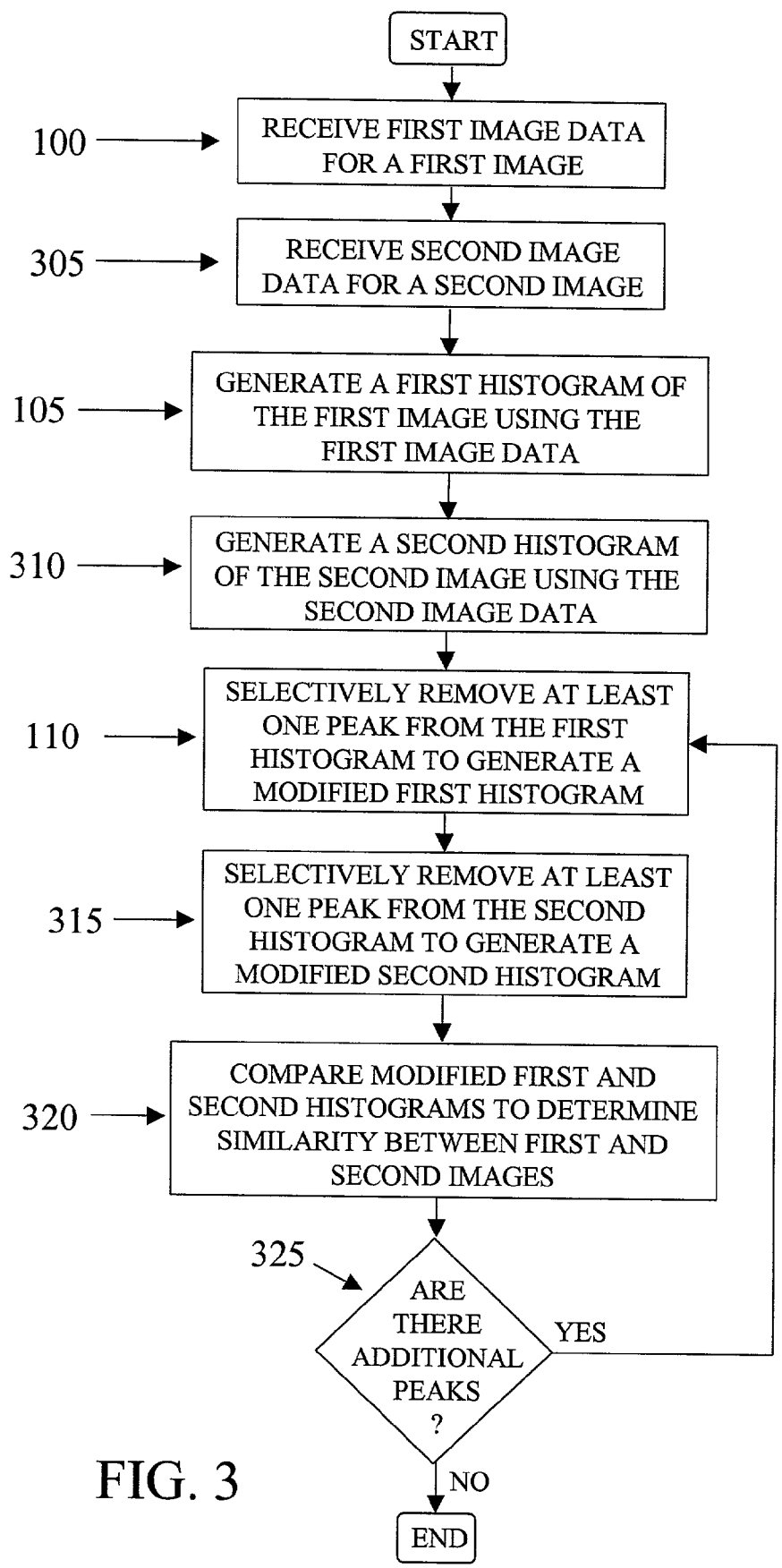
FIG. 3 is a flowchart illustrating the steps for processing images using histograms in accordance with an alternate exemplary embodiment of the present invention.

In step 115, the first image is processed using the modified first histogram. According to an exemplary embodiment, the similarity of two or more images can be determined by selectively removing at least one peak from corresponding histograms and comparing the modified histograms. This exemplary embodiment is illustrated in FIG. 3, where steps 100, 105 and 110 are the same as those illustrated in FIG. 1 to generate the modified first histogram. In step 305 of FIG. 3, second image data is received for a second image. As with the first image data for the first image, the second image data for the second image can be received from any electronic source over any type of electronic transmission medium that is capable of receiving and transmitting electronic information, whether received manually or automatically.

In step 310, a second histogram of the second image is generated using the second image data. The second histogram of the second image can be based on any feature or characteristic of the second image. As with the generation of the first histogram, any method known in the art of histogram generation can be used for generating the second histogram from the second image. Those of ordinary skill in the art will recognize that any number of histograms based on any feature or characteristic can be generated for the second image for use in the processing of images using histograms according to exemplary embodiments of the present invention.

According to exemplary embodiments, the second histogram can have at least one peak. However, skilled artisans will recognize that the second histogram may not have any peaks (e.g., if the second image is of a background texture, the resulting second histogram may have no defined peaks). If there is at least one peak in the second histogram, then in step 315, at least one peak from the second histogram is selectively removed to generate a modified second histogram. As with the generation of the modified first histogram, any method for selectively removing at least one peak from the second histogram can be used to generate the modified second histogram.

In FIG. 6A, second histogram 620 illustrates an exemplary second histogram of the second image. Each of the bins of second histogram 620 can correspond to a quantized level of any feature or characteristic of the second image. Those of ordinary skill in the art will recognize that second histogram 620 is merely an example of the second histogram that is used for purposes of illustration and not limitation, as second histogram 620 can change not only for different features and characteristics of the second image that have been quantized, but also for different images. Second histogram 620 has three peaks: narrow peak 622, with its maximum position at point B1 on the histogram; narrow peak 624, with its maximum position at point B2 on the histogram; and wide peak 626, with its maximum position at point B3. Wide peak 626 extends from $-\sigma_B$ to $\sigma_B$ on the histogram, and is, therefore $2\sigma_B$ wide.

As shown in FIG. 6B, modified second histogram 640 corresponds to second histogram 620, but with wide peak 626 selectively removed. According to an alternate exemplary embodiment, at least one filter can be used to selectively remove at least one peak in the first histogram. Any filter for selectively removing information from the second histogram can be used. According to an exemplary embodiment, the at least one filter is a stack filter. For example, a one-dimensional stack filter can be applied as a sliding filter window over second histogram 620 to selectively remove at least one peak from the second histogram to generate a modified second histogram. However, stack filters of higher dimensions and of any length can also be applied to the second histogram. Referring to FIG. 6A, a one-dimensional stack filter can be applied to second histogram 620 starting at, for example, bin 628. However, the one-dimensional stack filter can be applied to second histogram 620 starting at any bin to selectively remove any desired peak. Application of the stack filter selects a value from one of the bins within the stack filter window (e.g., the bin located at the center of the filter window). Once applied, the one-dimensional stack filter can be "slid" or otherwise shifted by at least one bin in the direction of increasing bins or quantization levels, or in any other direction, depending on the starting point of the stack filter window.

According to exemplary embodiments, the stack filter for selectively removing peaks from the second histogram includes a minimum filter and a maximum filter. For example, an "opening" stack filter can be used for performing a minimum stack filter followed by a maximum stack filter. According to exemplary embodiments, the at least one filter has a predetermined length.

Figure 5:
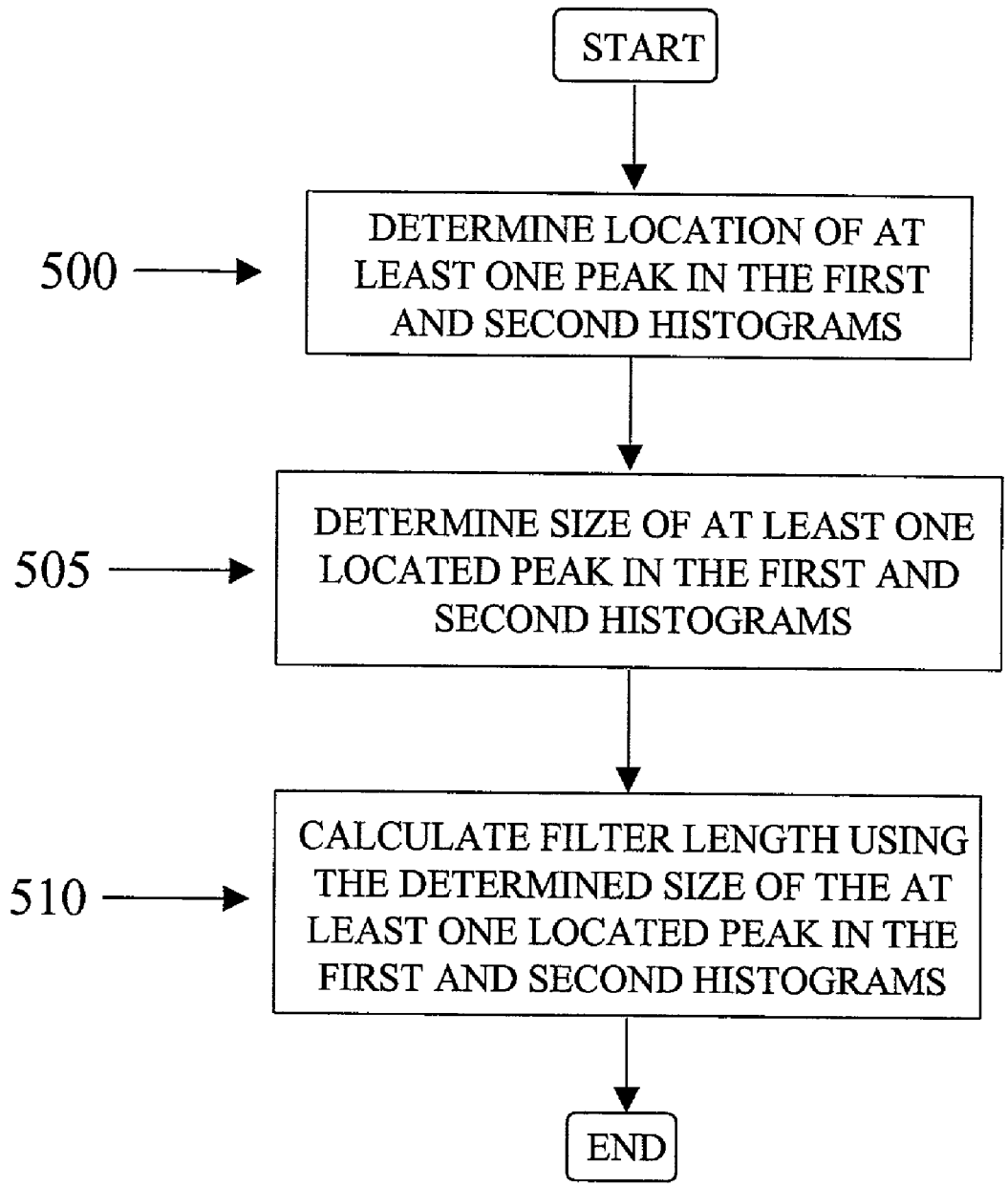
FIG. 5 is a flowchart illustrating the steps for selectively removing peaks from first and second histograms in accordance with an exemplary embodiment of the present invention.

According to an alternate exemplary embodiment, the filter length of the filters can be determined adaptively for each histogram based on the size of the at least one peak in the histogram. Referring to FIG. 5, in step 500, a determination is made of the location of at least one peak in the first and second histograms. Any method for detecting or locating at least one peak in a histogram can be used, such as that described in, for example, U.S. Pat. No. 4,731,863. Once located, then in step 505, a determination is made of the size (e.g., width) of the at least one located peak in the first and second histograms. Any method for determining the size of the at least one peak can be used. According to exemplary embodiments, the size of the at least one peak can be the width of the at least one peak, although any measure of size (e.g., height) can be used.

In step 510, the length of the least one filter is calculated using the determined size of the at least one located peak in the first histogram. For example, the length of the filter can be the same size as or larger than the width of the at least one peak. Thus, according to an exemplary embodiment, the length of the filters used to selectively remove at least one peak from the first and second histograms are not predetermined, but are adaptively determined based on the sizes (e.g., widths) of the at least one peak contained in the first and second histograms.

In step 320 of FIG. 3, the modified first histogram and the modified second histogram are compared to determine a similarity between the first image and the second image. Any method for determining the similarity between histograms can be used. For example, according to an exemplary embodiment, the modified first and second histograms can be compared by generating a distance measure between the modified first and second histograms that indicates the similarity of the histograms. The distance measure of the modified histograms can be based upon individual peaks, all peaks, or some subset of all peaks in each of the modified histograms (e.g., the N highest peaks, where N is any number less than the total number of peaks in a modified histogram).

Figure 4:
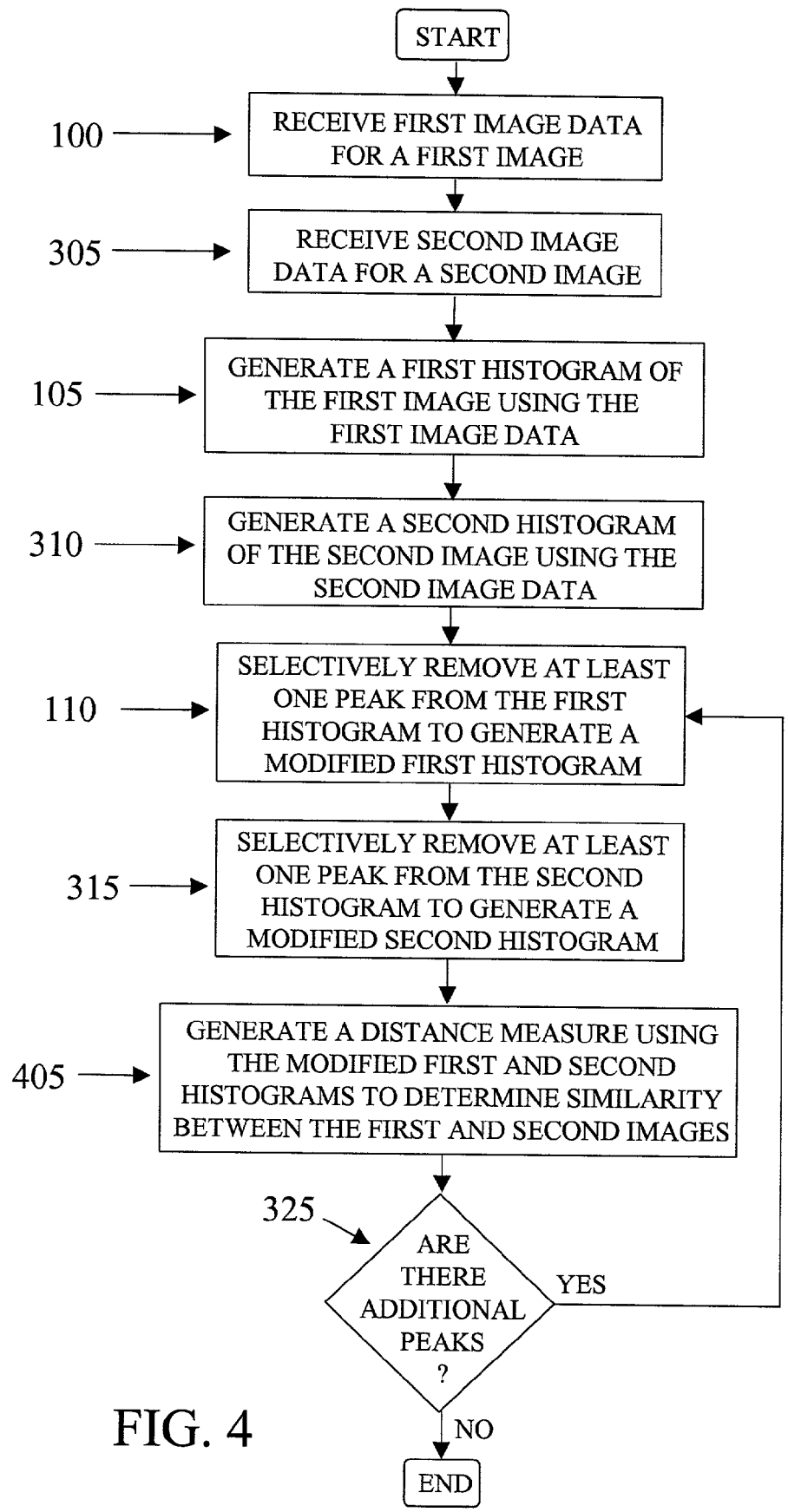
FIG. 4 is a flowchart illustrating the steps for processing images using histograms in accordance with an exemplary embodiment of the present invention.

In FIG. 4, steps 100, 305, 105, 310, 110 and 315 are the same as those illustrated in FIGS. 1 and 3 to generate the modified first and second histograms. In step 405 of FIG. 4, a distance measure is generated using the modified first and second histograms. The distance measure can be, for example, the maximum of the correlation function between the modified first and second histograms. Calculation of the correlation between histograms is described in, for example, U.S. Pat. No. 6,351,556, the disclosure of which is hereby incorporated by reference in its entirety. Rather than using a correlation function distance measure, an example of distance measure generation using a quadratic function is described in James Hafner, et al., "Efficient Color Histogram Indexing for Quadratic Form Distance Functions."

The first and second images are similar if the distance measure between the modified first and second histograms is less than a predetermined threshold value. Any predetermined threshold value can be used, depending on the desired degree of similarity between the images. According to exemplary embodiments, the similarity determination can be used, for example, in an image similarity search, where a user initiates an image database query to locate an image, in any type of image database, that is similar to a given image. The image that is retrieved from the image database is the image that is "closest" to the given image based on the distance measure between corresponding histograms and, consequently, most similar to the given image. However, any number of images that are less than the predetermined threshold value, and are, therefore, similar to the given image, can be retrieved from the image database.

For purposes of illustration and not limitation, referring to FIG. 6B, from a comparison of modified first histogram 630 and modified second histogram 640 in FIG. 6B using a maximum of the correlation function between these two histograms, the first image and the second image can be determined to be substantially similar. With the removal of the wide peaks, background information and other distributed image characteristics (e.g., texture) can be removed from the respective images. Thus, a comparison of the narrow peaks can correspond to a comparison of, for example, localized objects and features between the two images. In the example illustrated in FIG. 6B, comparison of the localized objects in the first and second images reveal that the images are similar with respect to these localized objects or features. However, the comparison result will vary, depending on the images being compared and the histograms generated from those images.

Figure 6C:
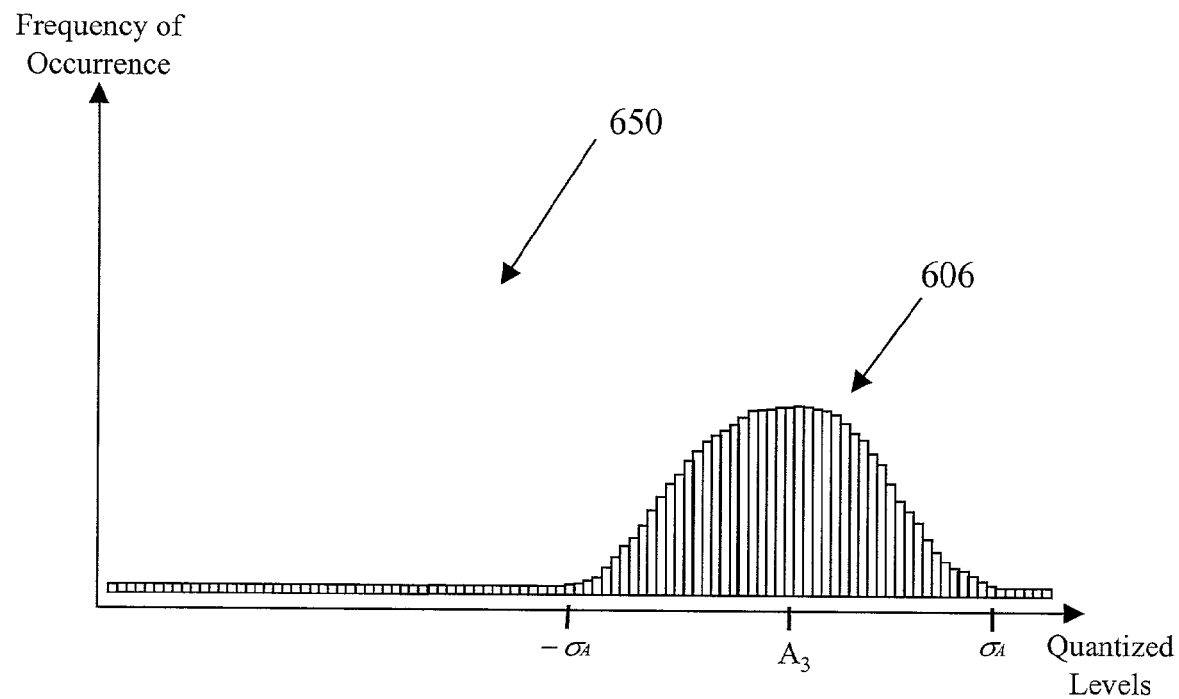
Figure 6C:
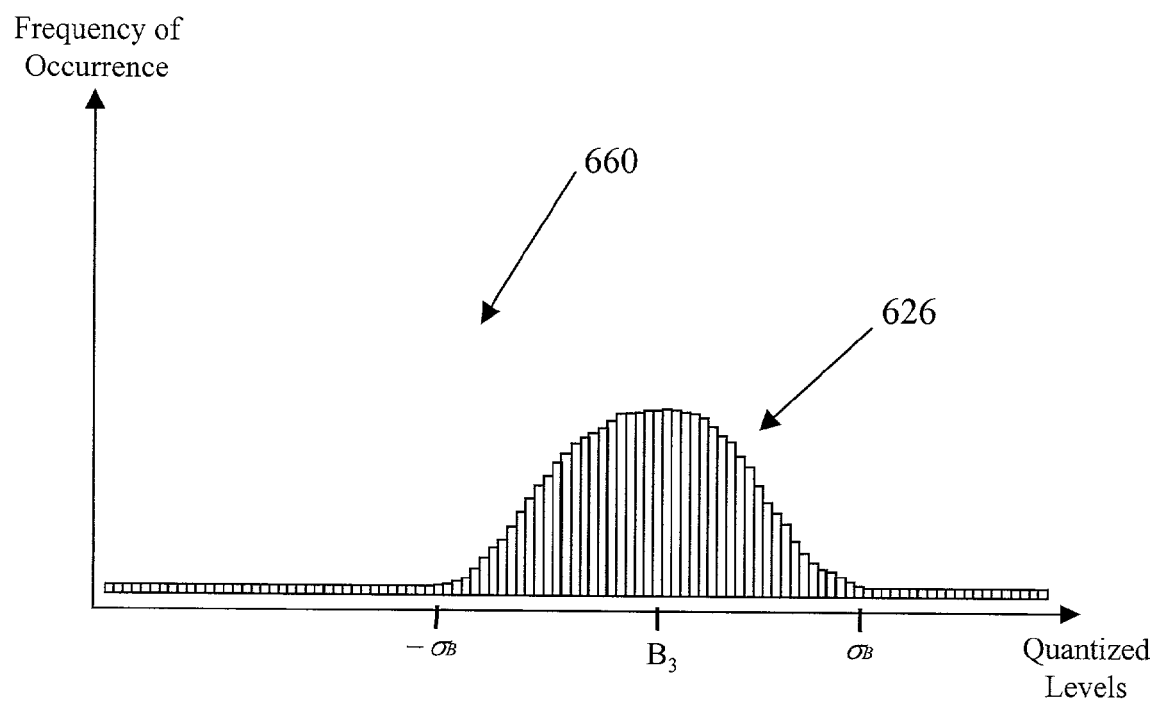

If it is determined in step 325 of FIG. 3 (or FIG. 4) that there are additional peaks in the first and second histograms, the steps of selectively removing (i.e., steps 110 and 315 of FIG. 3 and FIG. 4) and comparing (i.e., step 320 of FIG. 3 or step 405 of FIG. 4) are repeated for at least one peak in the first histogram and the second histogram. Thus, numerous modified histograms can be generated from the first and second histograms, depending on the number of peaks in each of the histograms. For example, as shown in FIG. 6C, all narrow peaks have been removed, leaving wide peak 606 of modified first histogram 650 and wide peak 626 of modified second histogram 660. For purposes of illustration and not limitation, referring to FIG. 6C, the maximum of the correlation function between the two histograms will be high, because the two wide peaks have approximately the same shape. However, the maximum will not be in the coordinate origin, because the corresponding wide peaks are not centered around the same point. Thus, from FIG. 6C, wide peaks 606 and 626 have a larger distance measure, since these respective peaks are not substantially aligned in the two modified histograms.

From a comparison of modified first histogram 650 and modified second histogram 660 in FIG. 6C, the first image and the second image can be determined to be moderately similar. With the removal of the narrow peaks, localized objects and features can be removed from the respective images. Thus, a comparison of the wide peaks can correspond to a comparison of, for example, background information between the two images. In the example illustrated in FIG. 6C, comparison of the background information in the first and second images reveal that the images are moderately similar with respect to the background information. However, the comparison result will vary, depending on the images being compared and the histograms generated from those images.

For the comparison step, at least one of the first histogram and each modified first histogram for each selectively removed peak of the first histogram is compared with at least one of the second histogram and each modified second histogram for each selectively removed peak of the second histogram to determine a similarity between the first image and the second image. In other words, to determine the similarity between the two images, any comparisons between any of the original and modified histograms can be performed. For example, the first (i.e., original) histogram and/or any combination of the first modified histograms can be compared with the second (i.e., original) histogram and/or any combination of the modified second histograms, while the second (i.e., original) histogram and/or any combination of the second modified histograms can be compared with the first (i.e., original) histogram and/or any combination of the modified second histograms Thus, using the illustrations in FIGS. 6B and 6C as examples, according to exemplary embodiments, a determination of similarity between the first image and second image can be based on a comparison of first histogram 600 and/or modified first histogram 630 with second histogram 620 and/or one or both of modified second histograms 640 and 660, while a comparison of second histogram 620 and/or modified second histogram 640 can be made with first histogram 600 and/or one or both of modified first histograms 630 and 640. According to exemplary embodiments, at least one peak from each of the first and second histograms is selectively removed and compared with all other peaks to determine the similarity between images. However, a similarity determination can be made by comparing any combination of original histograms and modified histograms that have any combination of peaks removed.

Thus, exemplary embodiments of the present invention can eliminate the influence of small feature variations between images when performing, for example, a similarity comparison. The influence of, for example, a localized object in one image can be removed by selectively removing, from the histogram, a narrow peak corresponding to the localized object. By comparing the modified histograms, exemplary embodiments can determine that at least two images exhibit a high degree of similarity (e.g., have similar backgrounds) despite the existence of localized objects in one of the images.

Figure 7:
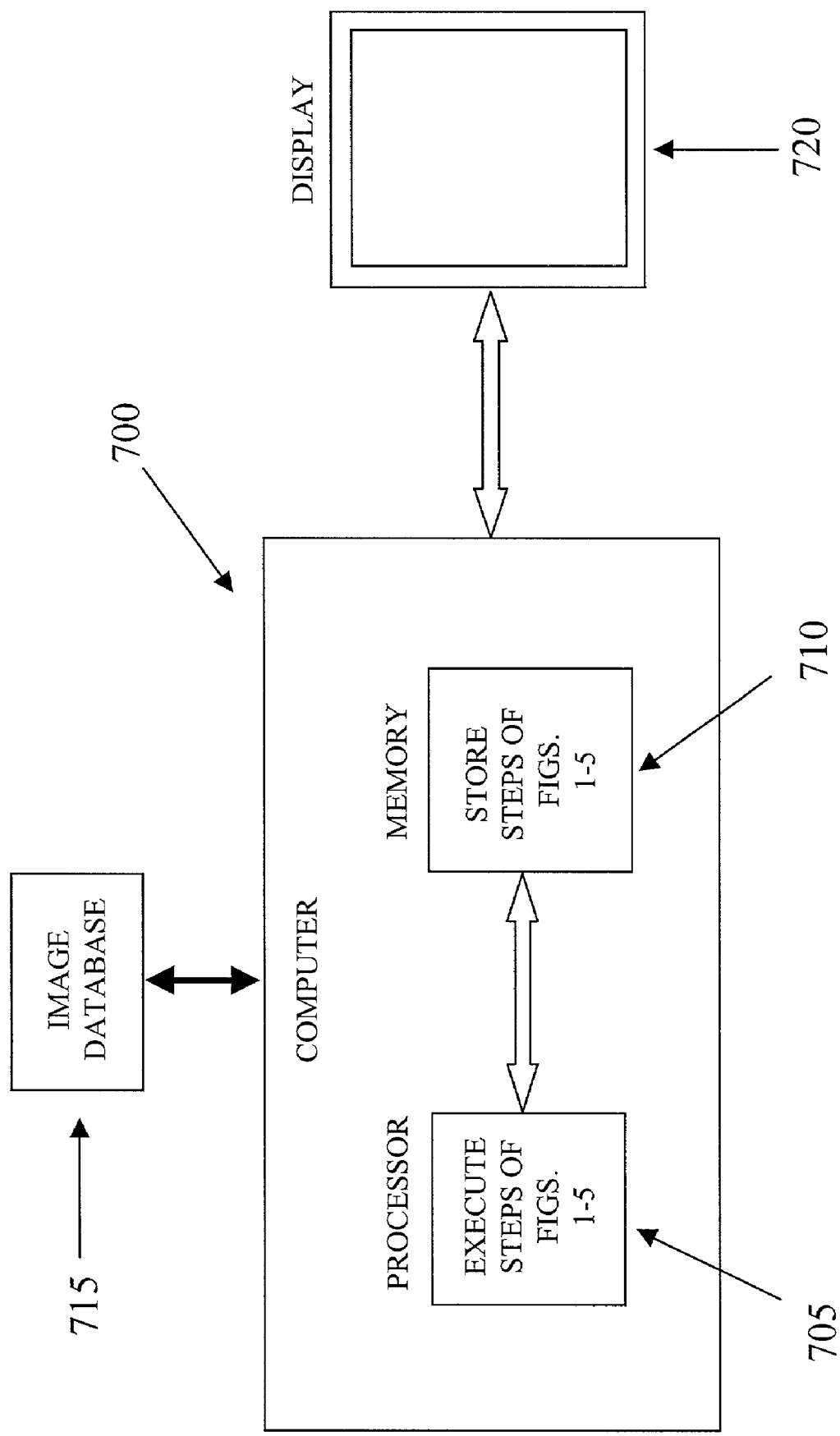
FIG. 7 illustrates a system for processing images using histograms in accordance with an exemplary embodiment of the present invention.

A system for processing images using histograms in accordance with exemplary embodiments of the present invention will be described with reference to FIG. 7. According to exemplary embodiments, an image is any image, stored in electronic form in any type of electronic storage medium or computer memory, from which a histogram can be generated.

The system of the present invention for processing images using histograms can be implemented using any combination of hardware, firmware or software. According to exemplary embodiments, the steps of a computer program as illustrated in FIGS. 1–5 can be performed using a computer 700, such as, for example, a personal computer or any other computer system. Computer 700 can include a memory 710. Memory 710 can be any computer memory or any other type of electronic storage media that is located either internally or externally to computer 700. Memory 710 can store, for example, the steps of a computer program as illustrated in FIGS. 1–5. As will be appreciated based on the foregoing description, memory 710 can be programmed using conventional techniques known to those having ordinary skill in the art of computer programming to carry out the steps of a computer program as illustrated in FIGS. 1–5 described herein. The actual source code or object code for carrying out the steps of a computer program as illustrated in FIGS. 1–5 can be stored in memory 710.

Memory 710 stores steps of a computer program to receive first image data for a first image, generate a first histogram of the first image using the first image data, selectively remove at least one peak from the first histogram to generate a modified first histogram, and process the first image using the modified first histogram. The first image data can be received from any location using any form of electronic communication over any type of electronic transmission medium with which electronic information can be transmitted and received, either manually or automatically. The first histogram of the first image can be based on any feature or characteristic of the first image. Any method known in the art of histogram generation can be used for generating the first histogram from the first image. Any method for selectively removing at least one peak from the first histogram can be used. Those of ordinary skill in the art will recognize that any number of histograms based on any feature or characteristic can be generated for the first image for use in the processing of images using histograms according to exemplary embodiments of the present invention.

According to an alternate exemplary embodiment, at least one filter can be used to selectively remove at least one peak in the first histogram. Any filter for selectively removing information from the first histogram can be used. According to an exemplary embodiment, the at least one filter is a stack filter. According to exemplary embodiments, the stack filter for selectively removing at least one peak from the first histogram includes a minimum filter and a maximum filter. For example, an "opening" stack filter can be used for performing a minimum stack filter followed by a maximum stack filter. According to exemplary embodiments, the at least one filter has a predetermined length.

According to an alternate exemplary embodiment, the filter length of the filters can be determined adaptively for each histogram based on the sizes of the at least one peak in the histogram. Memory 710 stores steps of a computer program to determine a location of at least one peak in the first histogram. Any method for detecting or locating at least one peak in a histogram can be used, such as that described in U.S. Pat. No. 4,731,863. Memory 710 also stores steps of a computer program to determine a size of the at least one located peak in the first histogram. Any method for determining the size of the at least one peak can be used. According to exemplary embodiments, the size of the at least one peak can be the width of the at least one peak, although any measure of size (e.g., height) can be used. Memory 710 stores steps of a computer program to calculate a length of the least one filter using the determined size of the at least one located peak in the first histogram. For example, the length of the filter can be the same size as or larger than the width of the at least one peak.

According to an exemplary embodiment, the similarity of two or more images can be determined by selectively removing at least one peak from corresponding histograms and comparing the modified histograms. Memory 710 stores steps of a computer program to receive second image data for a second image. As with the first image data for the first image, the second image data for the second image can be received from any electronic source over any type of electronic transmission medium, whether received manually or automatically. Memory 710 stores steps of a computer program to generate a second histogram of the second image using the second image data. The second histogram of the second image can be based on any feature or characteristic of the second image. As with the generation of the first histogram, any method known in the art of histogram generation can be used for generating the second histogram from the second image. Any number of histograms based on any feature or characteristic can be generated for the second image for use in the processing of images using histograms according to exemplary embodiments of the present invention.

According to exemplary embodiments, the second histogram has at least one peak. However, skilled artisans will recognize that the second histogram may not have any peaks (e.g., if the second image is of a background texture, the resulting second histogram may have no defined peaks). Memory 710 stores steps of a computer program to selectively remove at least one peak from the second histogram to generate a modified second histogram. As with the generation of the modified first histogram, any method for selectively removing at least one peak from the second histogram can be used.

According to an alternate exemplary embodiment, at least one filter can be used to selectively remove at least one peak in the first and second histograms. Any filter for selectively removing information from the histogram can be used. According to an exemplary embodiment, the at least one filter is a stack filter. According to exemplary embodiments, the stack filter for selectively removing peaks from the first histogram includes a minimum filter and a maximum filter. For example, an "opening" stack filter can be used for performing a minimum stack filter followed by a maximum stack filter. According to exemplary embodiments, the at least one filter has a predetermined length.

According to an alternate exemplary embodiment, the filter length of the filters can be determined adaptively for each histogram based on the sizes of the at least one peak in the histogram. Memory 710 stores steps of a computer program to determine the location of at least one peak in the first and second histograms. Any method for detecting or locating at least one peak in a histogram can be used, such as that described in U.S. Pat. No. 4,731,863. Memory 710 stores steps of a computer program to determine the size (e.g., width) of the at least one located peak in the first and second histograms. Any method for determining the size of the at least one peak can be used. According to exemplary embodiments, the size of the at least one peak can be the width of the at least one peak, although any measure of size (e.g., height) can be used. Memory 710 also stores steps of a computer program to calculate the length of the least one filter using the determined size of the at least one located peak in the first and second histograms.

Memory 710 stores steps of a computer program to compare the modified first histogram and the modified second histogram to determine a similarity between the first image and the second image. Any method for determining the similarity between histograms can be used. For example, according to an exemplary embodiment, memory 710 stores steps of a computer program to generate a distance measure between the modified first and second histograms that indicates the similarity of the histograms. The distance measure of the modified histograms can be based upon individual peaks, all peaks, or some subset of all peaks in the modified histograms (e.g., the N highest peaks, where N is any number less than the total number of peaks in a modified histogram).

Memory 710 stores steps of a computer program to generate a distance measure using the modified first and second histograms. The distance measure can be, for example, the maximum of the correlation function between the modified first and second histograms. Calculation of the correlation between histograms is described in, for example, U.S. Pat. No. 6,351,556. Rather than using a correlation function distance measure, an example of distance measure generation using a quadratic function is described in James Hafner, et al., "Efficient Color Histogram Indexing for Quadratic Form Distance Functions." The first and second images are similar if the distance measure between the modified first and second histograms is less than a predetermined threshold value. Any predetermined threshold value can be used, depending on the desired degree of similarity between the images.

Memory 710 stores steps of a computer program to repeat the steps of selectively removing and comparing for at least one peak in the first histogram and the second histogram. Thus, numerous modified histograms can be generated from the first and second histograms, depending on the number of peaks in each of the histograms. At least one of the first histogram and each modified first histogram for each selectively removed peak of the first histogram is compared with at least one of the second histogram and each modified second histogram for each selectively removed peak of the second histogram to determine a similarity between the first image and the second image. In other words, to determine the similarity between the two images, any comparisons between any of the original and modified histograms can be performed. According to exemplary embodiments, at least one peak from each of the first and second histograms is selectively removed and compared with all other peaks to determine the similarity between images. However, a similarity determination can be made by comparing any combination of original histograms and modified histograms that have any combination of peaks removed.

Any and all images, modified images, histograms, and modified histograms can be displayed to a user on a display, such as, for example, display 715, that is used in conjunction with computer 700. Display 715 can be a computer monitor or any other video display device for displaying graphical and/or textual information to a user.

Computer 700 also includes means for accessing memory 710 to execute the steps of a computer program as illustrated in FIGS. 1–5. The means for accessing can be, for example, a processor 705. Processor 705 can be any known processor, such as, for example, a microprocessor. However, the means for accessing can be any combination of hardware, firmware or software. Computer 700 can also be connected to at least one other computer in a computer network using any form of network connection, such as, for example, an Ethernet connection.

The steps of a computer program as illustrated in FIGS. 1–5 for processing images using histograms can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for processing images using histograms, comprising the steps of:
   receiving first image data for a first image;
   generating a first histogram of the first image using the first image data;
   determining a location of at least one peak in the first histogram;
   selectively removing the at least one peak from the first histogram to generate a modified first histogram; and
   processing the first image using the modified first histogram.

2. The method of claim 1, comprising the steps of:
   receiving second image data for a second image;
   generating a second histogram of the second image using the second image data; and
   selectively removing at least one peak from the second histogram to generate a modified second histogram.

3. The method of claim 2, wherein the step of processing comprises the step of:
   comparing the modified first histogram and the modified second histogram to determine a similarity between the first image and the second image.

4. The method of claim 3, comprising the step of:
   repeating the steps of selectively removing and comparing for at least one peak in the first histogram and the second histogram.

5. The method of claim 4, wherein at least one of the first histogram and each modified first histogram for each selectively removed peak of the first histogram is compared with at least one of the second histogram and each modified second histogram for each selectively removed peak of the second histogram to determine a similarity between the first image and the second image.

6. The method of claim 3, wherein the step of comparing comprises the step of:
   generating a distance measure using the modified first and second histograms, wherein the first and second images are similar when the distance measure is less than a predetermined threshold value.

7. The method of claim 2, wherein at least one filter is used to selectively remove at least one peak in the first and second histograms.

8. The method of claim 7, wherein the at least one filter is a stack filter.

9. The method of claim 8, wherein the stack filter includes a minimum stack filter and a maximum stack filter.

10. The method of claim 7, wherein the at least one filter has a predetermined length.

11. The method of claim 7, wherein the steps of selectively removing comprise the step of:
determining a location of at least one peak in the first and second histograms.

12. The method of claim 11, comprising the steps of:
determining a size of at least one located peak in the first and second histograms; and
calculating a length of the at least one filter using the determined size of at the least one located peak in the first and second histograms.

13. A method for processing images using histograms, comprising the steps of:
receiving first image data for a first image and second image data for a second image;
generating a first histogram of the first image using the first image data;
generating a second histogram of the second image using the second image data;
selectively removing at least one peak from the first histogram to generate a modified first histogram;
selectively removing at least one peak from the second histogram to generate a modified second histogram; and
comparing the modified first histogram and the modified second histogram to determine a similarity between the first image and the second image.

14. The method of claim 13, comprising the step of:
repeating the steps of selectively removing and comparing for at least one peak in the first histogram and the second histogram.

15. The method of claim 13, wherein at least one filter is used to selectively remove at least one peak in the first and second histograms.

16. The method of claim 15, wherein the at least one filter is a stack filter.

17. The method of claim 13, wherein the step of comparing comprises the step of:
generating a distance measure using the modified first and second histograms, wherein the first and second images are similar when the distance measure is less than a predetermined threshold value.

18. A system for processing images using histograms, comprising:
a memory that stores the steps of a computer program to:
receive first image data for a first image,
generate a first histogram of the first image using the first image data,
determine a location of at least one peak in the first histogram,
selectively remove the at least one peak from the first histogram to generate a modified first histogram, and
process the first image using the modified first histogram; and
means for accessing the memory to execute the computer program.

19. The system of claim 18, wherein the memory stores steps of a computer program to:
receiving second image data for a second image;
generating a second histogram of the second image using the second image data; and
selectively remove at least one peak from the second histogram to generate a modified second histogram.

20. The system of claim 19, wherein the memory stores steps of a computer program to:
compare the modified first histogram and the modified second histogram to determine a similarity between the first image and the second image.

21. The system of claim 20, wherein the memory stores steps of a computer program to:
repeat the steps of selectively removing and comparing for at least one peak in the first histogram and the second histogram.

22. The system of claim 21, wherein at least one of the first histogram and each modified first histogram for each selectively removed peak of the first histogram is compared with at least one of the second histogram and each modified second histogram for each selectively removed peak of the second histogram to determine a similarity between the first image and the second image.

23. The system of claim 20, wherein the memory stores steps of a computer program to:
generate a distance measure using the modified first and second histograms, wherein the first and second images are similar when the distance measure is less than a predetermined threshold value.

24. The system of claim 19, wherein at least one filter is used to selectively remove at least one peak in the first and second histograms.

25. The system of claim 24, wherein the at least one filter is a stack filter.

26. The system of claim 25, wherein the stack filter includes a minimum stack filter and a maximum stack filter.

27. The system of claim 24, wherein the at least one filter has a predetermined length.

28. The system of claim 24, wherein the memory stores steps of a computer program to:
determine a location of at least one peak in the first and second histograms.

29. The system of claim 28, wherein the memory stores steps of a computer program to:
determine a size of at least one located peak in the first and second histograms; and
calculate a length of the at least one filter using the determined size of at least one located peak in the first and second histograms.

30. A system for processing images using histograms, comprising:
a memory that stores the steps of a computer program to:
receive first image data for a first image and second image data for a second image,
generate a first histogram of the first image using the first image data,
generate a second histogram of the second image using the second image data,
selectively remove at least one peak from the first histogram to generate a modified first histogram,
selectively remove at least one peak from the second histogram to generate a modified second histogram, and
compare the modified first histogram and the modified second histogram to determine a similarity between the first image and the second image; and
means for accessing the memory to execute the computer program.

31. The system of claim 30, wherein the memory stores steps of a computer program to:
 repeat the steps of selectively removing and comparing for at least one peak in the first histogram and the second histogram.

32. The system of claim 30, wherein at least one filter is used to selectively remove at least one peak in the first and second histograms.

33. The system of claim 32, wherein the at least one filter is a stack filter.

34. The system of claim 30, wherein the memory stores steps of a computer program to:
 generate a distance measure using the modified first and second histograms, wherein the first and second images are similar when the distance measure is less than a predetermined threshold value.

35. A computer-readable medium containing a computer program for processing images using histograms, wherein the computer program performs the steps of:
 receiving first image data for a first image;
 generating a first histogram of the first image using the first image data;
 determining a location of at least one peak in the first histogram;
 selectively removing the at least one peak from the first histogram to generate a modified first histogram; and
 processing the first image using the modified first histogram.

36. The computer-readable medium of claim 35, wherein the computer program performs the steps of:
 receiving second image data for a second image;
 generating a second histogram of the second image using the second image data; and
 selectively removing at least one peak from the second histogram to generate a modified second histogram.

37. The computer-readable medium of claim 36, wherein the computer program performs the step of:
 comparing the modified first histogram and the modified second histogram to determine a similarity between the first image and the second image.

38. The computer-readable medium of claim 37, wherein the computer program performs the step of:
 repeating the steps of selectively removing and comparing for at least one peak in the first histogram and the second histogram.

39. The computer-readable medium of claim 38, wherein at least one of the first histogram and each modified first histogram for each selectively removed peak of the first histogram is compared with at least one of the second histogram and each modified second histogram for each selectively removed peak of the second histogram to determine a similarity between the first image and the second image.

40. The computer-readable medium of claim 37, wherein the computer program performs the step of:
 generating a distance measure using the modified first and second histograms, wherein the first and second images are similar when the distance measure is less than a predetermined threshold value.

41. The computer-readable medium of claim 40, wherein the computer program performs the step of:
 determining a size of at least one located peak in the first and second histograms; and
 calculating a length of the at least one filter using the determined size of at least one located peak in the first and second histograms.

42. The computer-readable medium of claim 36, wherein at least one filter is used to selectively remove at least one peak in the first and second histograms.

43. The computer-readable medium of claim 42, wherein the at least one filter is a stack filter.

44. The computer-readable medium of claim 43, wherein the stack filter includes a minimum stack filter and a maximum stack filter.

45. The computer-readable medium of claim 42, wherein the at least one filter has a predetermined length.

46. The computer-readable medium of claim 42, wherein the computer program performs the step of:
 determining a location of at least one peak in the first and second histograms.

* * * * *